Patented Sept. 25, 1928.

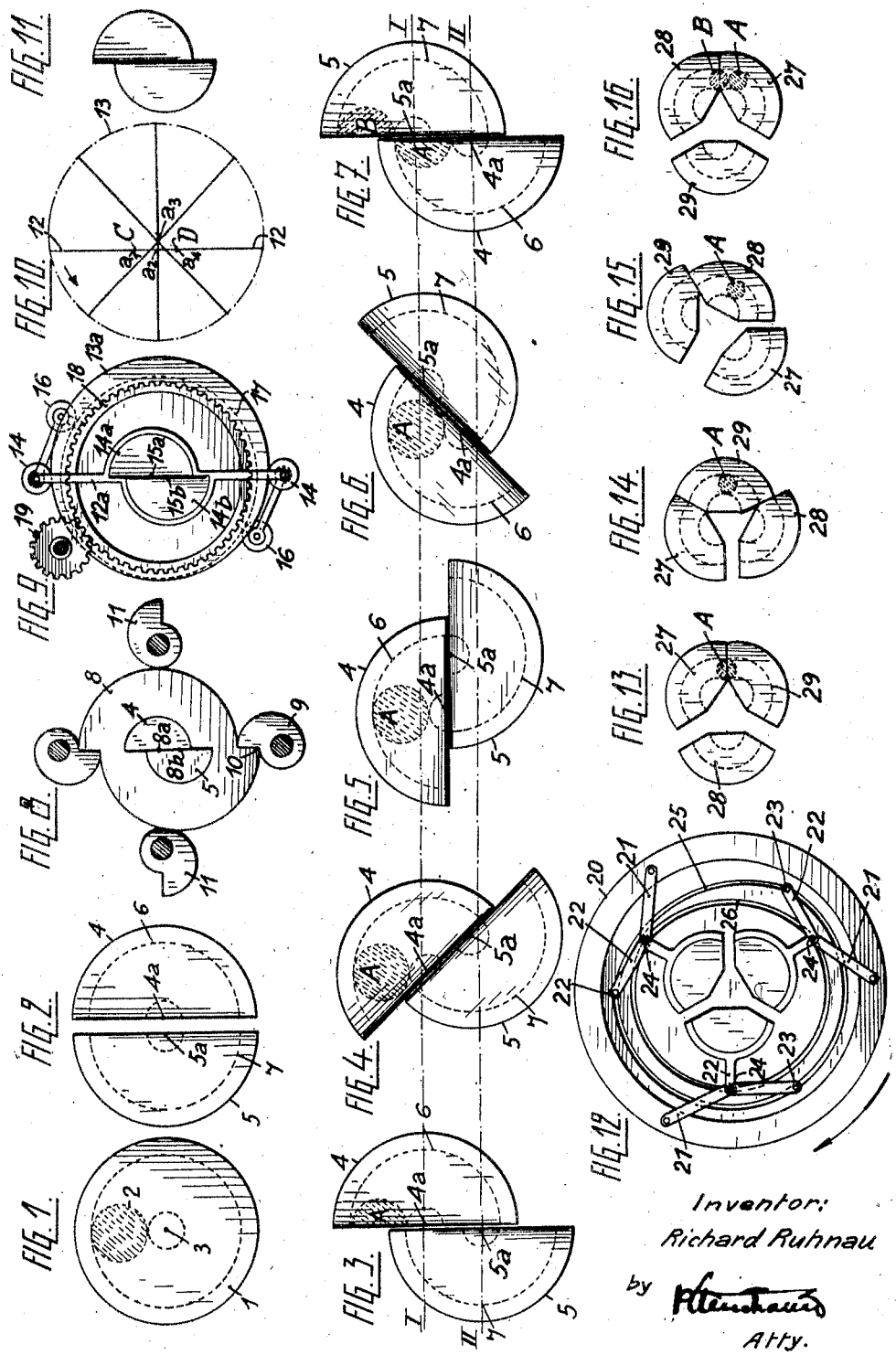

1,685,646

UNITED STATES PATENT OFFICE.

RICHARD RUHNAU, OF ESSEN-RUHR, GERMANY, ASSIGNOR OF ONE-HALF TO MAX STERN, OF ESSEN-RUHR, GERMANY.

OPTICAL SYSTEM.

Application filed November 28, 1925, Serial No. 72,034, and in Germany January 12, 1925.

My invention refers to optical systems, more especially for use in connection with moving picture apparatus, whereby moving pictures may be projected upon a screen from a continuously and uniformly moving film without an interception of the projecting light by a shutter or like device and whereby a complete and uniformly illuminated picture may at all times be presented upon the screen. There have been devised for this purpose devices in which the optical axis of the projecting lens is displaced in the same direction and in synchronism with the axis of the moving picture. However, such devices invariably require discs and endless bands carrying a great number of lenses. Moreover the optical axes of the lenses mounted on rotary discs do not travel in a straight line but on the periphery of a circle so that devices of that kind require cumbersome and complicated compensating means of a mechanical or optical kind. Furthermore these apparatus necessitate the use of lenses having a diameter inferior to 1, 9 cms. inasmuch as the distance between two succeeding lens axes must be equal to the height of a film picture. The loss of light occasioned by these small lenses would be such, more especially with lens systems having a great focal length, such as are usually employed in kinos, that the picture projected would be useless. A further difficulty which presents itself in apparatus of this kind is the arrangement of a greater number of single lenses on discs or bands in such manner that the axis of the lens, which is about to project the picture on the screen, is absolutely conguent to the axis of the corresponding picture, because the slightest oscillations would cause the picture on the screen to vibrate.

All these drawbacks are avoided in the simplest manner by the optical system according to the present invention which allows projecting moving pictures from a continuously and uniformly moving film without a shutter or the like by means of a single lens of any desired diameter without requiring other compensating means, such as mirrors, prisms and the like.

My invention is based upon the following facts: If a lens of any focus and diameter is traversed by a bundle of light rays eccentrically, i. e. in the zone between the centre and the circumference and is at the same time rotated about its centre, the bundle of light rays will not be influenced by the rotation nor by the fact that it does not pass through the central portion of the lens. An injurious distortion cannot occur inasmuch as a high class lens furnishes faultless pictures in all its parts including the circumferential portion. If a small distortion would occur, it would remain constant inasmuch as during the rotation of the lens the bundle of light rays always passes through uniform parts of the lens which are equally spaced from the centre. This shows that in order to project a bundle of light rays, it is not necessary that it pass through the centre of the lens. It is equally possible to utilize that part of the lens which extends between the centre and the circumference. If the lens, while rotating about its centre, also travels in a straight line in synchronism with the film, the bundle of light rays during this movement also traverses equal parts of the lens situated between the centre and the circumference. If only part of the lens, for instance one half, is used for projecting a film picture, the other half remains over for the projection of the next succeeding picture. If now the lens is divided into its two halves and if the two halves are displaced relatively to each other in such manner that the centres of the section lines are spaced apart the height of a film picture, a single lens is transformed into an optical projection system composed of lens segments by means of which the projection from a continuously and uniformly moving film can be effected in the simplest manner without an interception of the projection light by a shutter or like device.

I will now proceed to describe more particularly the character of my invention and how the same is performed, having reference to the drawings annexed to this specification and forming part thereof, in which all figures are mere diagrams illustrating various forms of embodiment by way of example.

In the drawings

Fig. 1 is a view showing an ordinary lens, and

Fig. 2 shows the same lens cut in two halves.

Figs. 3-7 illustrate the optical system obtained by displacing these two halves relative to each other as explained above and turning the system thus obtained about the centre of the right hand segment, while at the same time causing the system to move with this centre in a straight line.

Fig. 8 is a diagram showing a device for imparting this combined movement to a system of the kind shown in Figs. 3–7.

Fig. 9 illustrates another modification,

Fig. 10 being a diagram illustrating the operation of this device.

Fig. 11 illustrates a detail,

Fig. 12 shows a device for imparting to a system composed of three lens segments the movements required for causing each segment to travel in a straight line along with one of a row of film pictures and at the same time to rotate about its centre.

Figs. 13–16 are designed to illustrate the different phases of the movements executed by these segments.

Referring first to Fig. 1, 1 is an ordinary lens which is shown as being traversed by a bundle 2 of light rays in the part between its centre 3 and its circumference. If this lens is caused to rotate about its centre 3, the zone of the lens which is enclosed between the dotted circles will travel across the bundle of rays. If this lens is divided into its two halves 4 and 5 (Fig. 2) with the centres $4^a$ and $5^a$ of the section lines, and if the two halves are displaced relative to each other so as to space the centres $4^a$ and $5^a$ apart the height of a film picture, there results a system consisting of two half lenses having two zones 6 and 7 which can be utilized for the projection of two film pictures.

In Fig. 3 this system is shown in the position which it assumes when the first of two film pictures A and B shall be projected. The dot and dash lines I and II illustrate the distance between the centres of the lens segments which is equal to the height of a film picture. The picture $a$ travels from I to II and according to this invention it shall be accompanied by the lens segment 4 in such manner that, when the picture B is about to enter the plane I, the other lens segment 5 is ready to accompany it. According to the present invention this is rendered possible by causing the system of lenses as a whole to travel in a straight line from I to II together with the picture A and at the same time to rotate about the centre $4^a$ of segment 4, until the segment 4 has been rotated through 180° and its centre has reached the plane II when segment 5 will assume the position formerly assumed by segment 4, whereupon the entire system is now caused to rotate about the centre $5^a$ of segment 5 and is at the same time lowered in a straight line from I to II, thus moving in synchronism with the film picture B.

This sequence of movements is illustrated by Figs. 3–7 which speak for themselves and need not be explained in detail. Obviously segment 5 on being rotated about its centre $5^a$ and moved in a straight line from I to II will assume the same positions and will accompany picture B in exactly the same manner as shown in Figs. 3–7 with reference to segment 4 and picture A.

The problem of moving in this manner the system of lenses consisting of two halves rigidly connected with each other in staggered relation can be solved in a number of ways. A device for imparting to it this motion is shown for instance in Fig. 8. Here the two segments 4 and 5 are mounted in a disc 8, the two halves of which are staggered exactly as the two lens segments so that their centres are spaced apart the height of a film picture. The disc 8 is driven by a spiral wheel 9, the circumference of which is so curved that the ends are spaced apart the height of a picture, 10 being the driving face of the cam thus formed. Similar guide wheels 11 are distributed about the disc, the circumference of each wheel 9, 11 being equal to the circumference of one half of the disc 8, so that after wheel 9 has passed through one revolution, always one of the two shoulders of disc 8 arrives in front of the cam face 10. Wheel 9 now causes disc 8 to be alternately rotated about the centres $8^a$ and $8^b$ of the lens segments, the centre of rotation for the time being at the same time travelling in a straight line together with the axis of the film picture.

Fig. 9 illustrates another device for moving the optical system. This device is based upon the following facts: If a straight line is caused to rotate about a point which at the same time moves uniformly in a straight line, the ends of the straight line describe a curve such as shown for instance in Fig. 10, where the straight line 12 is assumed to be uniformly displaced the distance C—D and at the same time to rotate about its point $a$ which at first coincides with C. The points of intersection $a_1, a_2, a_3, a_4$, indicate the position of point $a$ on the line C—D corresponding to the angular positions of line 12 appertaining to them. The positions of the ends of line 12 are indicated by the curve 13, which predetermines the shape of the contour of the disc $13^a$ shown in Fig. 9, on the circumference of which are guided rollers 14 mounted at the ends of the bar $12^a$ (which corresponds to the straight line 12 in Fig. 10) carrying the lens system $14^a, 14^b$, whose centre points $15^a, 15^b$ alternately correspond to the point $a$ of the line 12 in Fig. 10. The ends of bar $12^a$ are pulled along on the circumference of disc $13^a$ by rollers 16 mounted at the ends of arms forming part of a ring 17 disposed behind the disc and being fixed to a toothed rim 18 driven by a pinion 19. The bar being thus rotated first about the centre $15^a$ of lens segment $14^a$, being guided by the curved circumference of disc $13^a$, is at the same time displaced so that after a half revolution the centre point 15ᵇ of the other segment 14ᵇ is carried into the position, which was initially occupied by 15ᵃ. Obviously this is the movement illustrated in Figs. 3-7.

Preferably the lens segments are coloured or coated near the straight edges in such manner as to show a progressive diminution of transparency in order to prevent two pictures from being projected onto the screen simultaneously, such progressive diminution of transparency being indicated in a conventional manner in Fig. 11 of the drawing.

In Fig. 12 is illustrated a device for moving a rotary system composed of three lens segments, the actual movements of which are shown in Figs. 13-16. In this system the optical centre point of the segment in course of projecting an image is again intended to travel vertically in a straight line, the other two segments being designed to move on a path which is adapted according to their velocity to carry them one after the other with the least possible resistance into the position initially occupied by the first segment. Obviously whenever this system of segments rotates through an angle of 120°, a film picture is accompanied by one of the segments and is projected so that the system may rotate at lower speed than a system composed only of two segments or halves, or else the system consisting of three segments can project a greater number of pictures per unit of time.

As shown in Fig. 12, the ring 20 rotating at a rate of ⅓ of a revolution per film picture pulls by means of links 21 the angular carriers 22 of the lens segments. The ends 23 of the carriers are guided in a notch 25, the angle points 24 in a notch 26, these notches being shaped according to a construction similar to the one shown in Fig. 10. The segments 27, 28, 29 being guided by these curved notches are caused to travel as shown in Figs. 13-16, the film picture A being accompanied by segment 27 and the following segment 28 being in position for projection as soon as the film picture B appears on the plane of projection (Fig. 16).

I wish it to be understood that I do not desire to be limited to the exact details of construction shown and described, for obvious modifications will occur to a person skilled in the art.

I claim:—

1. Optical system for moving picture projection comprising a plurality of segments of a circular lens and means for causing each segment to travel in a straight line with a film picture and to simultaneously rotate about its optical centre point.

2. Optical system for moving picture projection comprising a plurality of segments of a circular lens and means for moving such segments in front of the film eccentrically to the bundle of rays traversing the film with the optical axis of the lens moving in a straight line with the film.

3. Optical system for moving picture projection comprising a plurality of segments of a circular lens means for causing each segment to travel in a straight line with a film picture and means for rotating said segments in such manner as to cause only the zones intermediate the optical centre points and the circumference of such segments to pass across the bundle of projecting light rays.

4. Optical system for moving picture projection comprising a plurality of segments of a circular lens and means for first rotating this system of lenses about the optical centre of one of said segments and simultaneously moving it in line with the film and thereafter rotating said system about the optical centre of another segment and simultaneously moving it in line with the film.

5. Optical system comprising three segments of a circular lens, means for guiding said segments so as to cause them, one after the other, to travel in a straight line a distance equal to the height of a film picture and at the same time to rotate about its optical axis, and means for driving said guiding means.

In testimony whereof I affix my signature.

RICHARD RUHNAU.